(12) United States Patent
Card

(10) Patent No.: US 6,637,543 B2
(45) Date of Patent: Oct. 28, 2003

(54) OVERSTEER CONTROL FOR A MOTOR VEHICLE

(75) Inventor: James Myrl Card, Linwood, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/783,682

(22) Filed: Feb. 14, 2001

(65) Prior Publication Data

US 2002/0108805 A1 Aug. 15, 2002

(51) Int. Cl.[7] .............................................. B62D 5/04
(52) U.S. Cl. .......................... 180/446; 180/410; 701/41
(58) Field of Search ................................ 180/410, 408, 180/409, 446, 443, 412, 413; 701/36, 41

(56) References Cited

U.S. PATENT DOCUMENTS

| | | | |
|---|---|---|---|
| 4,412,594 A | * 11/1983 | Furukawa et al. | 180/414 |
| 4,706,771 A | * 11/1987 | Kawabe et al. | 701/42 |
| 4,974,875 A | 12/1990 | Sugasawa et al. | 280/5.51 |
| 5,054,568 A | * 10/1991 | Shiraishi et al. | 180/415 |
| 5,333,058 A | * 7/1994 | Shiraishi et al. | 701/72 |
| 5,345,385 A | * 9/1994 | Zomotor et al. | 180/422 |
| 5,402,342 A | * 3/1995 | Ehret et al. | 180/197 |
| 5,446,657 A | * 8/1995 | Ikeda et al. | 180/197 |
| 5,457,632 A | * 10/1995 | Tagawa et al. | 180/446 |
| 5,471,388 A | 11/1995 | Zomotor et al. | 180/410 X |
| 5,711,024 A | * 1/1998 | Wanke | 180/197 |
| 5,828,972 A | * 10/1998 | Asanuma et al. | 180/446 |
| 5,845,222 A | * 12/1998 | Yamamoto et al. | 180/422 |
| 6,050,360 A | 4/2000 | Pattok et al. | 180/446 |

* cited by examiner

*Primary Examiner*—F. Zeender
(74) *Attorney, Agent, or Firm*—Michael D. Smith

(57) ABSTRACT

A system for compensating for the oversteer of a motor vehicle includes a controller configured to receive input signals from at least one sensor. The controller may be configured to produce an output signal that is capable of being received by a steering system of the motor vehicle. The input signals typically include a steering pinion gear angle signal, a vehicle velocity signal, and a yaw rate signal. The output signal may be received by a motor that is configured to provide power assist to the steering system in order to maintain the stability of the motor vehicle during an oversteer condition. A method of using the system includes receiving the signals into the controller, producing at least one transmittable output signal to the steering system of the motor vehicle, and articulating at least one steerable wheel in response to the output signal. Receiving the signals into the controller typically includes receiving signals corresponding to a yaw angular velocity actual value and a required yaw angular velocity value signal. Receiving the required yaw angular velocity value signal may include receiving a steering pinion gear angle signal, receiving a motor vehicle velocity signal, and mathematically combining the two signals. The output signal may then be produced by determining the difference between the required yaw angular velocity and the yaw angular actual value signal with respect to time. The articulating of the steerable wheel is typically effectuated through a mechanical manipulation of either the electric power steering system or a variable resistance device.

10 Claims, 2 Drawing Sheets

OVERSTEER CONTROL FOR A MOTOR VEHICLE

TECHNICAL FIELD

This disclosure relates to the oversteer control of a motor vehicle, and, more particularly, to the simultaneous use of vehicle state sensors to control motor vehicle oversteer through active and passive steering mechanisms.

BACKGROUND

Motor vehicle handling instabilities are generally a function of the yaw behavior of the motor vehicle and the motor vehicle speed. The yaw behavior is caused by the lateral movement of the motor vehicle and is most often the result of a combination of operator input and road surface conditions. Such lateral movement may occur in response to the oversteering of the motor vehicle. Oversteering, which generally results in the motor vehicle articulating a turn that is too tight, may provide less than optimal handling of the motor vehicle, especially when maneuvering the motor vehicle through rapid or sharp corners.

Various arrangements for compensating for the oversteering of motor vehicles have typically been attained by relating the yaw behavior of the motor vehicle to the braking function. One particular arrangement involves the comparison of a vehicle yaw angular velocity required value and an actual vehicle yaw angular velocity of the motor vehicle. In such an arrangement, the vehicle yaw angular velocity required value is formed from measured quantities such as motor vehicle speed and steering wheel angle. The actual vehicle yaw angular velocity is measured using a gyroscope or other device. The difference between the yaw angular velocity required value and the yaw angular velocity actual value is calculated and is used to represent a detected handling situation or yaw behavior of the motor vehicle. A critical detected handling situation is deduced when the yaw angular velocity actual value deviates from the yaw angular velocity required value. This detected deviation is then used to minimize the motor vehicle yaw by the independent braking or acceleration of the individual wheels of the motor vehicle.

Other arrangements for compensating for vehicle yaw moments utilize the suspension aspects of the motor vehicle. In such arrangements, yaw moment sensors apply varying distributions of loading to the lateral wheels of the motor vehicle to induce "drift" or movement of either the front or rear end of the motor vehicle to correspond with a line of travel of the motor vehicle. In order to effectuate such applications, the motor vehicle typically includes devices for detecting and quantifying the cornering and acceleration of the motor vehicle. Devices for applying the varying distributions of loading to the lateral wheels are communicably linked to the cornering and acceleration devices and produce yaw moments in the direction of an oversteering condition. By inducing yaw moments in the direction of an oversteering condition, unwanted drift of the motor vehicle can be alleviated.

SUMMARY

A system and a method for compensating for the oversteer of a motor vehicle is described herein. The system includes a controller in operable communication with a steering system of the motor vehicle. The controller may be configured to receive input signals from at least one sensor and may also be configured to process the input signals to produce an output signal that is capable of being received by the steering system of the motor vehicle. The input signals may include a steering pinion gear angle signal, a vehicle velocity signal, and a yaw rate signal. The output signal may be received by a motor that is configured to provide power assist to the steering system in an effort to maintain the stability of the motor vehicle during an oversteer condition. The stability of the motor vehicle is typically maintained through control of the steering system, which may or may not be autonomous. Furthermore, the stability of the motor vehicle may be maintained by the manipulation of at least one steerable wheel of the motor vehicle.

The method for compensating for the oversteer of the motor vehicle includes receiving signals into the controller, producing at least one transmittable output signal to the steering system of the motor vehicle, and articulating at least one steerable wheel in response to the output signal. Receiving the signals into the controller typically may include receiving signals corresponding to a yaw angular velocity actual value and a required yaw angular velocity value. Receiving the required yaw angular velocity value signal may include receiving a steering pinion gear angle signal, receiving a motor vehicle velocity signal, and mathematically combining the two signals. The output signal may then be produced by determining the difference between the required yaw angular velocity and the yaw angular actual value signal with respect to time. The articulating of the steerable wheel is typically effectuated through a mechanical manipulation of either the electric power steering system or the steerable wheels.

DETAILED DESCRIPTION

Figure 1:
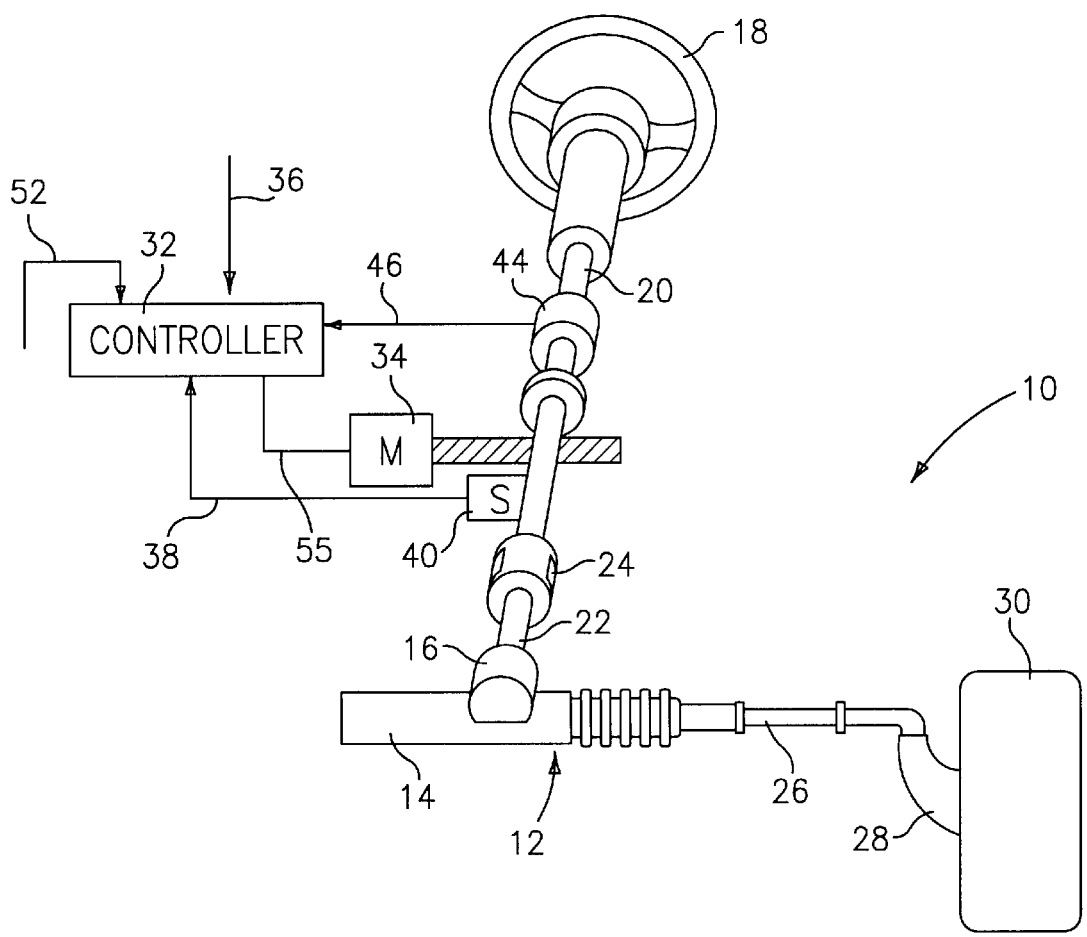
FIG. 1 is a schematic representation of a power steering system of a motor vehicle.

Referring to FIG. 1, a power steering system for a motor vehicle is shown generally at 10. Power steering system 10 may be an electric power steering system and comprises a system for the oversteer control of the motor vehicle and a conventional rack and pinion steering mechanism, shown generally at 12. Rack and pinion steering mechanism 12 includes a toothed rack 14 and a pinion gear (not shown) disposed within a gear housing 16. A hand steering device 18, which may be a steering wheel, is disposed on an upper steering shaft 20 and is accessible by an operator (not shown) of the motor vehicle. Upon rotation of hand steering device 18, upper steering shaft 20 turns a lower steering shaft 22 through a universal joint 24. Lower steering shaft 22 turns the pinion gear. Rotation of the pinion gear causes the lateral translation of the rack thereacross, which in turn moves tie rods 26 (only one of which is shown), each of which move steering knuckles 28 (only one of which is shown), thereby effectuating the movement of at least one steerable wheel 30 to steer the motor vehicle.

Power assist is provided through a controller 32 and a power assist actuator comprising an electric motor 34. Controller 32 receives electric power from a vehicle electric power source (not shown), a vehicle velocity signal 36 from a vehicle velocity sensor (shown below with reference to FIG. 2), a steering pinion gear angle signal 38 from a rotational position sensor 40, and a yaw angular velocity actual value signal 52 from a yaw rate sensor (shown below with reference to FIG. 2). As hand steering device 18 is turned, a torque sensor 44 senses the torque applied to hand steering device 18 by the operator and provides a torque signal 46 to controller 32. Additionally, as the rotor of motor 34 turns, rotor position signals for each phase are generated within motor 34 and are transmitted to controller 32. In response to vehicle velocity signal 36, yaw angular velocity actual value signal 52, and steering pinion gear angle signal 38 received by controller 32, controller 32 derives the desired motor currents and provides such currents to motor 34 in the form of an output signal 55, which effectuate the manipulation of power steering system 10 to maintain the stability of the motor vehicle during an oversteer condition.

Figure 2:
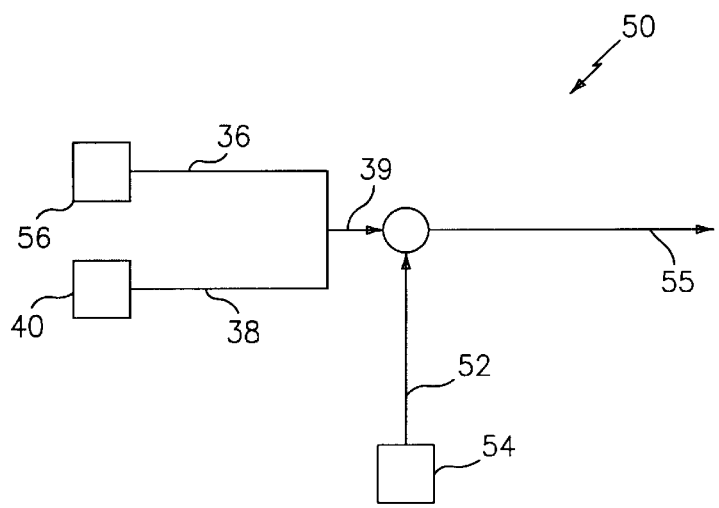
FIG. 2 is a schematic representation of a controller of the power steering system.

Referring now to FIG. 2, a system for the oversteer control of a motor vehicle is shown generally at 50 and is hereinafter referred to as "oversteer system 50". Oversteer system 50 comprises a portion of the controller of the power steering system. An oversteer condition is encountered when the yaw angular velocity of the motor vehicle is larger than what was originally anticipated by the operator of the motor vehicle. Evaluation of a potential oversteer condition typically involves the manipulation of vehicle velocity signal 36, steering pinion gear angle 38, and a required yaw angular velocity value 39.

To evaluate a potential oversteer condition, yaw angular velocity actual value signal 52 is typically measured using at least one acceleration sensor 54 positioned within the motor vehicle and configured to measure the radial acceleration of the motor vehicle. Other possible instruments that can be utilized for determining yaw angular velocity actual value 52 include, but are not limited to, the use of a fiber optical gyroscope (not shown). In any case, yaw angular velocity actual value 52 provides a measurement of the rate at which the motor vehicle moves in the directions angular to the conventional forward direction of travel.

Vehicle velocity signal 36 is obtained from the vehicle velocity signal sensor, which is shown at 56. Vehicle velocity signal sensor 56 may comprise a rotational speed sensor that measures the speed at which a wheel of the motor vehicle rotates. Vehicle velocity signal sensor 56 may also comprise a number of individual sensing units that correspond to different wheels of the motor vehicle, measure the rotational speed at which the different wheels rotate, and calculate an average rotational speed of the wheels. In either case, the rotational speed is mathematically manipulated to produce vehicle velocity signal 36.

Rotational position sensor 40 is configured to provide steering pinion gear angle signal 38 in the form of an output voltage that corresponds to a rotational angle through a complete revolution of the upper and lower steering shafts and of the pinion gear. Although the upper and lower steering shafts and the pinion gear typically rotate as a unit through the same rotational angle to control the angle of the steerable wheels with respect to the body of the motor vehicle, the full extent of the movement of the rack may require multiple axial rotations of the upper and lower shafts and the pinion gear. In such a case, the multiple axial rotations of the shafts and the pinion gear correspond to multiple rotations of rotational position sensor 40. When rotational position sensor 40 is configured to rotate multiple times to effectuate a full movement of the rack, rotational position sensor 40 provides a unique and continuously varying voltage between rotational positions at some angular position to either side of the center position. Once rotational position sensor 40 crosses the rotational positions to either side of the center position, the voltage is rolled over to repeat the variation with further rotation in the same direction.

Required yaw angular velocity value 39 is determined from a combination of vehicle velocity signal 36 from vehicle velocity signal sensor 56 and steering pinion gear angle signal 38 from rotational position sensor 40. Values of signals 36, 38 are mathematically manipulated in an algorithm (not shown) to produce required yaw angular velocity value 39. Required yaw angular velocity value 39 is then compared with yaw angular velocity actual value 52. A handling condition, which may result in an oversteer condition, is deduced when required yaw angular velocity value 39 and yaw angular velocity actual value 52 are determined to be unequal and a difference therebetween is calculated.

Output signal 55 is generated by determining the change in the difference between required yaw angular velocity value 39 and yaw angular velocity actual value 52 with respect to time. In order to minimize the deviation between required yaw angular velocity value 39 and yaw angular velocity actual value 52 (thereby alleviating the handling condition), output signal 55 is transmitted to an active steering system such as a speed variable assist device through the controller to alter the angles of the steerable wheels with respect to the direction of travel of the motor vehicle.

Output signal 55 may also be transmitted to the electric power steering system where the handling situation can be alleviated by providing mechanical control of the hand steering device that supersedes an operator input. Such mechanical control can be effectuated in varying degrees, viz., through either total or partial manipulation of the steering column through the power assist actuator. During total manipulation, the hand steering device is either rendered unrotatable by the operator, or its rotation by the operator has no effect on the positioning of the steerable wheels. During partial manipulation, the steering column has a variable resistance associated with it that increases or decreases with the increased or decreased effort of the operator to rotate the hand steering device.

Output signal 55 may also be transmitted to steering systems such as those incorporating steer-by-wire functions, front active steering, four-wheel steering, or combinations thereof. In such systems, the controller may respond to output signal 55 in such a manner to cause the motor vehicle to realize autonomous control that supersedes an operator input either totally or partially, thereby preventing a handling situation and a potential oversteer condition. During the autonomous control, the steerable wheels of the motor vehicle are typically angled relative to the motor vehicle body in such a manner to compensate for any yawed motion of the motor vehicle.

Figures 3, 4:
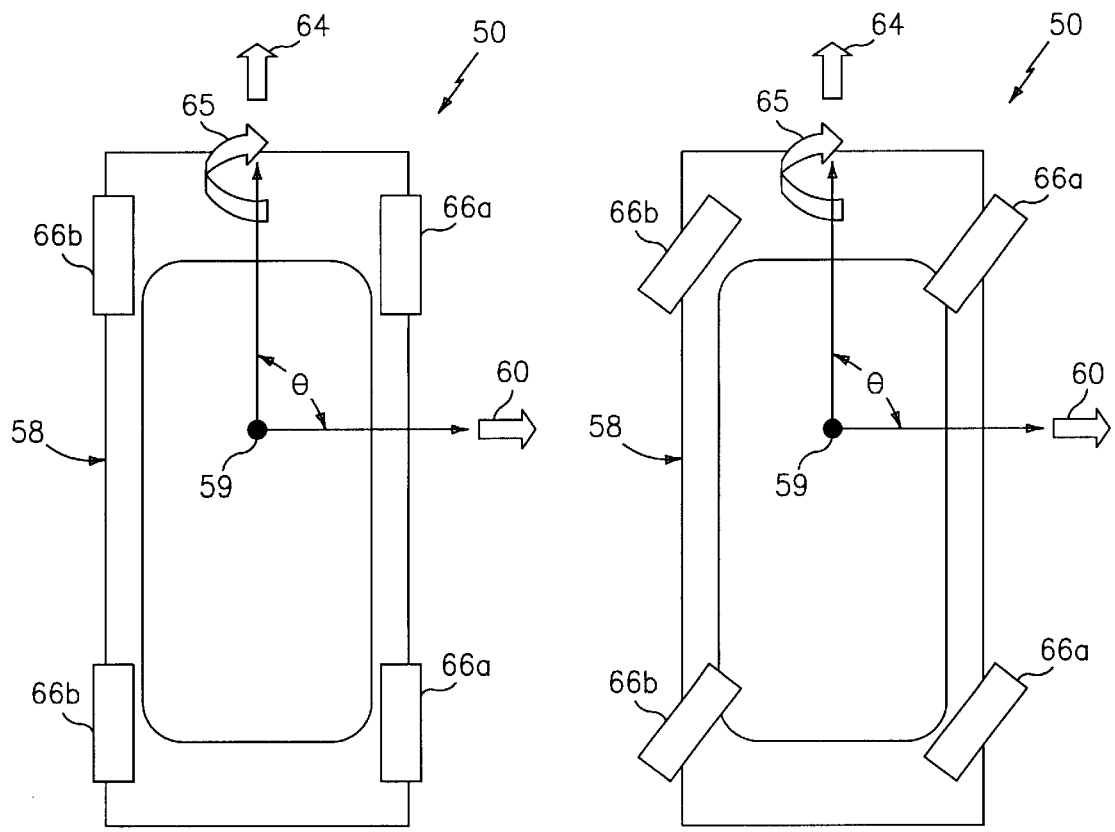
FIG. 3 is a schematic representation of the motor vehicle without an oversteer system responding to a yaw moment.
FIG. 4 is a schematic representation of the motor vehicle utilizing an oversteer system in response to a yaw moment.

Referring now to FIGS. 3 and 4, the use of oversteer system 50 and autonomous control to compensate for yawed motion of a motor vehicle, shown generally at 58, is illustrated. Motor vehicle 58 includes a four-wheel steering system and a center of gravity 59. In FIG. 3, an angular moment represented by an arrow 60 is shown acting on motor vehicle 58. An angle θ is defined by arrow 60 and an arrow 64 indicating the forward direction of travel of motor vehicle 58 when no yaw moments are experienced. Without oversteer system 50, an operator of motor vehicle 58 would maintain control thereof throughout a handling condition experienced by motor vehicle 58. If the handling condition escalates into an oversteer condition, motor vehicle 58 remains responsive to the actions of the operator, which are typically a function of the driving skills of the operator. In an instance where the angular moment of motor vehicle 58 is great enough such that an oversteer condition is encountered, a combination of the frictional resistances between the road surface and the wheels 66a, 66b of motor vehicle 58 and the distance from center of gravity 59 to the road surface determine the behavior of motor vehicle 58. If the frictional resistance between the road surface and wheels 66a is low, motor vehicle 58 will slide in the direction of arrow 60 while maintaining its orientation in the direction of arrow 64. If the frictional resistance between the road surface and wheels 66a is high, the forces acting on motor vehicle 58 will have a tendency to cause wheels 66b to be raised up off the road surface during the travel of motor vehicle 58 in the direction of arrow 60 through the yawed moment. If the inertial forces acting on motor vehicle 58 are great enough, motor vehicle 58 may be subject to motion in the direction of an arrow 65 as it proceeds in the direction of arrow 60. In either case, oversteer system 50 is activated by the velocity signal, yaw rate signal, and steering pinion gear angle signal to avoid such moments by correcting any yaw moments experienced by motor vehicle 58.

In FIG. 4, upon generation of the proper signals from the vehicle velocity signal sensor, the yaw rate sensors, and the rotational position sensor, wheels 66a, 66b of motor vehicle 58 are autonomously controlled by oversteer system 50 and compensate for the yaw moment in the direction of arrow 60. In such a situation, regardless of whether oversteer system 50 is incorporated into a motor vehicle having a steer-by-wire function, a front active steering system, or a four-wheel steering system, the yaw moment is at least partially compensated for and motor vehicle 58 can continue moving in the direction indicated by arrow 64 intended by the operator with little or no risk that an oversteer condition will be encountered or that it will be subject to inertial forces causing it to move in the direction of arrow 65.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. A control system for a motor vehicle, comprising:
    a controller configured to receive input data; and
    a steering system operably connected to said controller, said steering system being configured to compensate for yaw moments of said motor vehicle; and
    wherein said steering system is configured to provide autonomous control of said motor vehicle to supersede an existing operator input to said control system upon a detection of a predetermined value of said input data.

2. An oversteer control system for a motor vehicle comprising:
    a controller, said controller being configured to receive input signals front at least one sensor, said controller being con figured to process said input signals and to produce an output signal capable of being received by a steering system of said motor vehicle in operable communication with said controller;
    wherein said output signal is received by a motor configured to provide power assist to said steering system of said motor vehicle in order to maintain the stability of said motor vehicle during an oversteer condition,
    wherein said output signal transfers control of said motor vehicle to said steering system to manipulate at least one steerable wheel of said vehicle during an oversteer condition;
    wherein said steering system provides autonomous control of said motor vehicle to supersede an existing operator steering input to said oversteer control system during said oversteer condition.

3. The oversteer control system of claim 2 wherein said steering system is an electric power steering system.

4. The oversteer control system of claim 2 wherein said steering system is a variable effort steer system.

5. The oversteer control system of claim 2 wherein said steering system is a steer-by-wire system.

6. The oversteer control system of claim 2 wherein said steering system is an active front steering system.

7. The oversteer control system of claim 2 wherein said steering system is a four wheel steering system.

8. The oversteer control system of claim 2 wherein said input signals comprise,
    a steering pinion gear angle signal,
    a vehicle velocity signal, and
    a yaw rate signal.

9. The oversteer control system of claim 2 wherein said output signal is received by a motor configured to provide power assist to said steering system of said motor vehicle in order to maintain the stability of said motor vehicle during an oversteer condition.

10. The oversteer control system of claim 2 wherein said output signal transfers control of said motor vehicle to said steering system to manipulate at least one steerable wheel of said vehicle during an oversteer condition.

\* \* \* \* \*